United States Patent
Matsumoto et al.

[11] Patent Number: 6,009,137
[45] Date of Patent: Dec. 28, 1999

[54] MID-SHROUD JOINT FOR A BOILING WATER REACTOR

[75] Inventors: Jack T. Matsumoto, Sunnyvale; Alex Fife, San Jose, both of Calif.

[73] Assignee: General Electric Company, Schenectady, N.Y.

[21] Appl. No.: 09/017,431

[22] Filed: Feb. 2, 1998

Related U.S. Application Data

[60] Provisional application No. 60/057,552, Aug. 29, 1997.

[51] Int. Cl.[6] .................................................. G21C 13/00
[52] U.S. Cl. ...................... 376/302; 376/260; 376/287; 376/461
[58] Field of Search .................................. 376/260, 287, 376/302, 461

[56] References Cited

U.S. PATENT DOCUMENTS 5,737,378  4/1998  Ballas et al. ............................ 376/287
5,802,129  9/1998  Deaver et al. .......................... 376/302

*Primary Examiner*—Charles T. Jordan
*Assistant Examiner*—Jack Keith
*Attorney, Agent, or Firm*—Armstrong Teasdale LLP

[57] ABSTRACT

A mid-shroud joint which improves the replaceability of the shroud is described. In one embodiment, the shroud includes a core shroud and a lower shroud. A core plate support flange is clamped between the core shroud and the lower shroud, and the core plate support flange supports a core plate. The mid-shroud joint is formed by a flange of the core shroud and a flange of the lower shroud. The core plate support flange is positioned between core shroud and lower shroud flanges, and openings in these flanges align so that bolts can be inserted through such aligned openings.

14 Claims, 4 Drawing Sheets

MID-SHROUD JOINT FOR A BOILING WATER REACTOR

CROSS REFERENCE TO RELATED APPLICATION

This application claims the benefit of U.S. Provisional Application Ser. No. 60/057,552, filed Aug. 29, 1997.

FIELD OF THE INVENTION

This invention relates generally to boiling water nuclear reactors and more particularly, to a shroud for such a reactor.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick. A substantially cylindrical core shroud is positioned within, and spaced from, the shell walls to restrain horizontal movement of the reactor core fuel bundles and provides flow separation between the downcomer and the upward core flow. Specifically, the shroud is a cylindrical, steel structure which surrounds the core and provides a barrier to separate the upward flow through the core from the downward flow in the annulus between the shroud and the reactor pressure vessel. The lower section of the shroud supports several components. For example, the core plate and two sets of in-core guide tube restraints are supported by the shroud lower section. The core plate also supports the top end of the in-core guide tubes.

Sections of the shroud are subjected to high fluence levels. For example, the upper section of the shroud, opposite the core, is in a high fluence area. The lower section of the shroud, below the core, is in a lower fluence area. Irradiation is known to assist in the cracking of some BWR materials. Thus, the upper shroud section may be more susceptible to irradiated assisted stress corrosion cracking (IASCC) than the lower section of the shroud because of high fluence levels.

Some known shrouds include a bolted joint at the bottom of the core. Typically, however, the shroud is formed by welding a plurality of stainless steel cylindrical sections together. Specifically, respective ends of adjacent shroud sections are joined with a circumferential weld. Thus, if the upper section of the shroud needs to be replaced, the entire shroud may have to be removed. Removing the entire shroud requires the removal of the core plate and other components. In some known reactor configurations, the top grid is bolted to the top of the shroud, and the top grid can be removed and replaced without requiring removal of the shroud.

It would be desirable to provide a shroud which allows the removal of an upper section of the shroud without requiring that the lower section of the shroud and the core plate need to be removed. It also would be desirable that such a shroud provide the same functionality as known shrouds.

SUMMARY OF THE INVENTION

These and other objects may be attained by a mid-shroud joint which improves the replaceability of the shroud. In one embodiment, the shroud includes a core shroud and a lower shroud. A core plate support flange is clamped between the core shroud and the lower shroud, and the core plate support flange supports a core plate. The mid-shroud joint is formed by a flange of the core shroud and a flange of the lower shroud. The core plate support flange is positioned between core shroud and lower shroud flanges, and openings in these flanges align so that bolts can be inserted through such aligned openings.

The core shroud can be removed from the lower shroud without affecting the lower shroud and the core plate, and the position and alignment between the core plate and the lower shroud is not affected by removing the core shroud. The above described shroud allows the section of the shroud which is in the higher fluence area, i.e., the core shroud, to be removed without affecting the core plate and the lower shroud. Therefore, the upper shroud may be replaced independently from the lower shroud. In addition, the upper shroud can be replaced independently from the core plate, which eliminates the need for re-alignment of the core plate. Further, the core plate may be replaced independently from the upper shroud. The two piece shroud also is believed to be easier to handle, construct and replace than known one piece shroud, and the replacement time and material are believed to be decreased as compared to such one piece shrouds.

DETAILED DESCRIPTION

Figure 1:
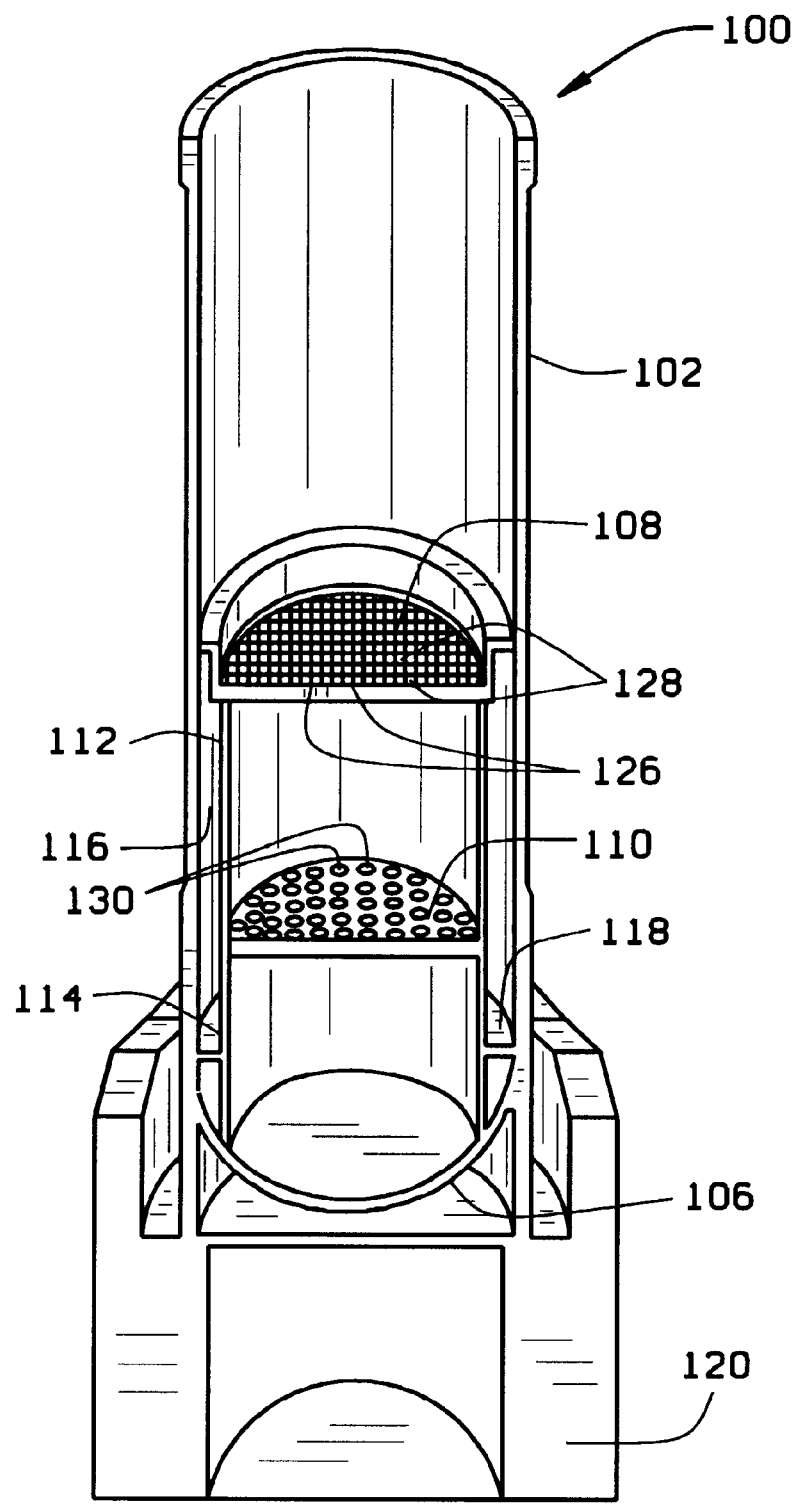
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically by structure not shown.

Figure 2:
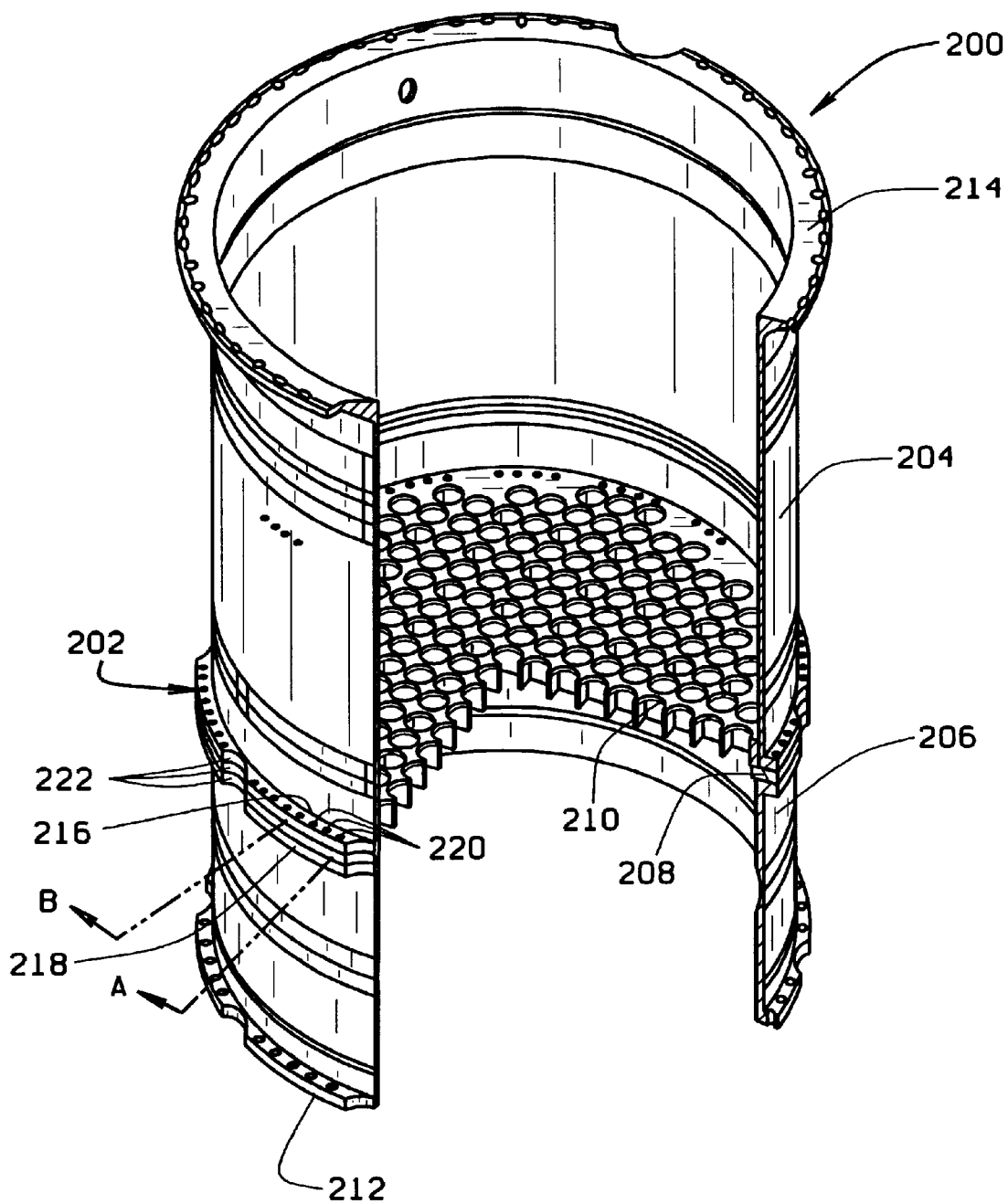
FIG. 2 is a perspective view of a shroud with a portion cut away in accordance with one embodiment of the present invention.

FIG. 2 is a perspective view of a shroud 200 with a portion cut away in accordance with one embodiment of the present invention. Specifically, the present invention is directed to a mid-shroud joint 202 which improves the replaceability of shroud 200 should it be necessary. Shroud 200 includes a core shroud 204 and a lower shroud 206. A flange 208 is clamped between core shroud 204 and lower shroud 206. Flange 208 supports a core plate 210. Lower shroud 206 includes a flange 212 for being secured to a shroud support (not shown) and core shroud 204 includes a flange 214 for being secured to a shroud head (not shown).

With respect to mid-shroud joint 202, such joint 202 is formed by a flange 216 of core shroud 204 and a flange 218 of lower shroud 206. Core plate support flange 208 is positioned between flanges 216 and 218, and openings 220 in flanges 208, 216, and 218, align so that bolts can be inserted through such aligned openings as described below. Scalloped regions 222 in flanges 208, 216, and 218 align so that reactor components can extend along side shroud 200.

Figure 3:
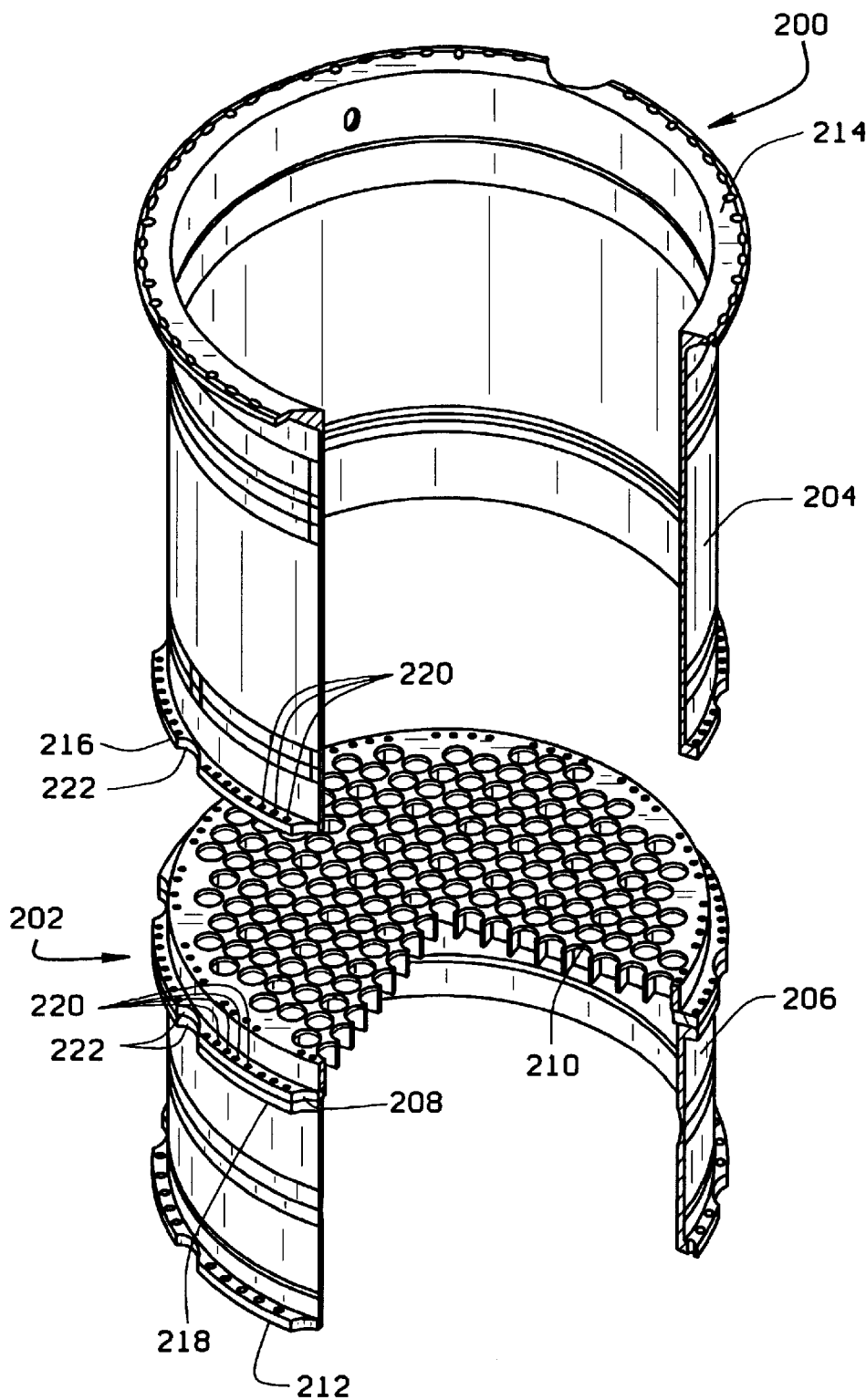
FIG. 3 is an exploded view of the shroud shown in FIG. 2.

FIG. 3 is an exploded view of shroud 200 shown in FIG. 2. Various connection elements such as bolts, nuts, keepers and wedges are not shown in FIG. 3. As shown in FIG. 3, core shroud 204 can be removed from lower shroud 206 without affecting lower shroud 206 and core plate 210, and the position and alignment between core plate 210 and lower shroud 206 is not affected by removing core shroud 204.

Figure 4:
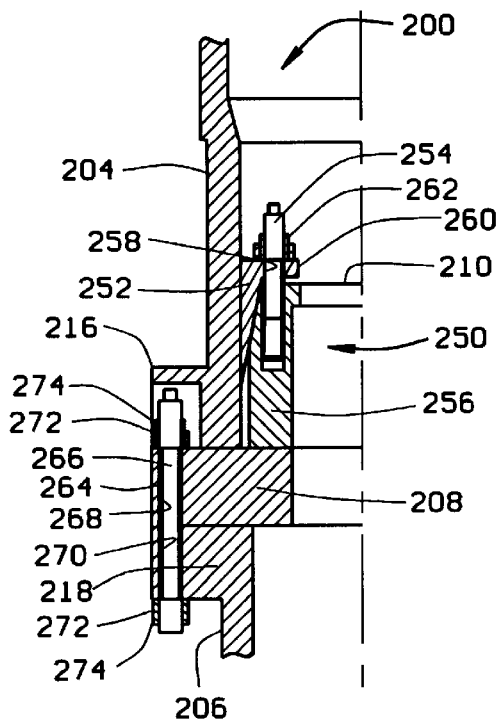
FIG. 4 is a cross sectional view of the flange attachment utilized in connection with the shroud shown in FIG. 2.

FIG. 4 is a cross sectional view of a flange attachment 250 utilized in connection with shroud 200. As shown in FIG. 4, wedges 252 are secured to a stud 254 which extends from a rim 256 of core plate 210. Specifically, stud 254 extends through an opening 258 in an extension 260 of wedge 252. Stud 254 is threadedly secured to rim 256. A nut 262 is threadedly engaged to stud 254 and tightened against wedge 252. Wedge 252 extends between core shroud 204 and rim 256 of core plate 210 and horizontally restrains core plate 210. To remove core shroud 204, and since there are several wedges 252 which bear against the inside surface of core shroud 204, such wedges 252 must be removed. Wedges 252 can be remotely removed and installed by removing nut 262 and lifting wedge 252 off stud 254.

Approximately four stud/nut/keeper assemblies 264 secure flange 208 to lower shroud 206. Specifically, a threaded stud 266 extends through aligned openings 268 and 270 in flange 208 and lower shroud 206. Nuts 272 and keepers 274 are tightened against lower shroud flange 218 and core plate flange 208, respectively. Assemblies 264 maintain the position and alignment of core plate flange 208. Assemblies 264 do not need to be removed to remove core shroud 204.

Figure 5:
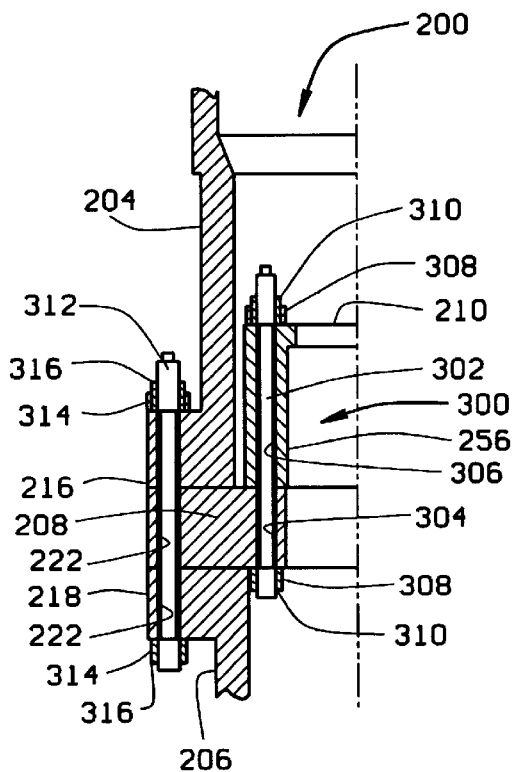
FIG. 5 is a cross sectional view of the core shroud attachment utilized in connection with the shroud shown in FIG. 2.

FIG. 5 is a cross sectional view of a core shroud attachment 300 utilized in connection with shroud 200. As shown in FIG. 5, a threaded stud 302 extends through aligned openings 304 and 306 in flange 208 and rim 256 of core plate 210. Nuts 308 and keepers 310 are threadedly engaged to stud 302 and are tightened against flange 308 and core plate 210. The position and alignment of core plate 210 are maintained during removal of core shroud 204 by assemblies 300 which bolt core plate 210 to flange 208.

A threaded stud 312 extends through aligned openings 222 in core shroud flange 216, core plate flange 208, and lower shroud flange 218. Nuts 314 and keepers 316 are threadedly engaged to stud 312 and tightened against respective flanges 216 and 218. Studs 312, nuts 314 and keepers 316 bolt core shroud 204 to lower shroud 206 and clamp flange 208. When studs 312, nuts 314, and keepers 316 are removed, core shroud 204 can be lifted from lower shroud 206.

Many alternations and variations of the above described core shroud are contemplated. For example, flange 208 could be integral with lower shroud 206 rather than a separate piece as illustrated in the drawings. Fabricating flange 208 as a separate piece reduces the size of the forging required for lower shroud 206.

The above described shroud allows the section of the shroud which is in the higher fluence area, i.e., the core shroud, to be removed without affecting the core plate and the lower shroud. Therefore, the upper shroud may be replaced independently from the lower shroud. In addition, the upper shroud can be replaced independently from the core plate, which eliminates the need for re-alignment of the core plate. Further, the core plate may be replaced independently from the upper shroud. The two piece shroud also is believed to be easier to handle, construct and replace than known one piece shroud, and the replacement time and material are believed to be decreased as compared to such one piece shrouds.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A shroud for a nuclear reactor, said shroud comprising:
    a core shroud having a flange at one end thereof, a plurality of openings in said core shroud flange;
    a lower shroud having a flange at one end thereof, a plurality of openings in said lower shroud flange;
    a core plate flange located between said core shroud flange and said lower shroud flange, said core plate flange having a plurality of openings therein; and
    a plurality of threaded studs extending through aligned openings in said core shroud flange and said lower shroud flange.

2. A shroud in accordance with claim 1 wherein said studs are secured to said flanges by nuts and keepers.

3. A shroud in accordance with claim 1 wherein said core plate flange is secured to said lower shroud by studs extending through aligned openings in said core plate flange and said lower shroud flange.

4. A shroud in accordance with claim 1 further comprising a core plate secured to said core plate flange by studs extending through aligned openings in said core plate flange and said core plate.

5. A shroud in accordance with claim 4 further comprising a plurality of wedges positioned between said core plate and said core shroud.

6. A mid-shroud joint for a shroud of a nuclear reactor, the shroud including a core shroud and a lower shroud, said mid-shroud joint comprising:
    a core shroud flange at one end of the core shroud, a plurality of openings in said core shroud flange;
    a lower shroud flange at one end of the lower shroud, a plurality of openings in said lower shroud flange;
    a core plate flange located between said core shroud flange and said lower shroud flange, said core plate flange having a plurality of openings therein; and
    a plurality of threaded studs extending through aligned openings in said core shroud flange and said lower shroud flange.

7. A mid-shroud joint in accordance with claim 6 wherein said studs are secured to said flanges by nuts and keepers.

8. A mid-shroud joint in accordance with claim 6 wherein said core plate flange is secured to said lower shroud flange by studs extending through aligned openings in said core plate flange and said lower shroud flange.

9. A mid-shroud joint in accordance with claim 6 further comprising a core plate secured to said core plate flange by studs extending through aligned openings in said core plate flange and said core plate.

10. A mid-shroud joint in accordance with claim 9 further comprising a plurality of wedges positioned between the core plate and the shroud.

11. A method for assembling a shroud of a nuclear reactor, the shroud including a core shroud having a core shroud flange at one end thereof and a plurality of openings in the core shroud flange, a core plate flange having a plurality of openings, and a lower shroud having a lower shroud flange at one end thereof and a plurality of openings in the lower shroud flange, said method comprising the steps of:

positioning the core shroud over the lower shroud;

positioning the core plate flange between the core shroud flange and the lower shroud flange; and inserting a plurality of threaded studs through aligned openings in the core shroud flange and the lower shroud flange.

12. A method in accordance with claim 11 further comprising the steps of securing the studs to the flanges by nuts and keepers.

13. A method in accordance with claim 11 further comprising the step of positioning a core plate flange between the core shroud flange and the lower shroud flange.

14. A method in accordance with claim 13 further comprising the steps of securing a core plate to the core plate flange and positioning a plurality of wedges between the core plate and the shroud.

* * * * *